UNITED STATES PATENT OFFICE.

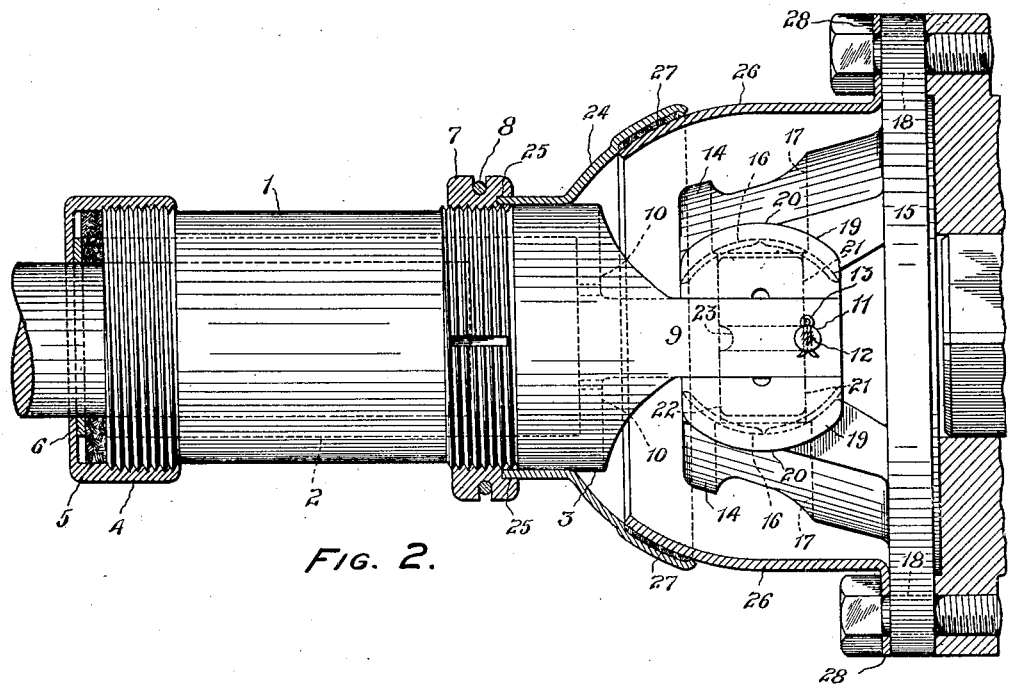
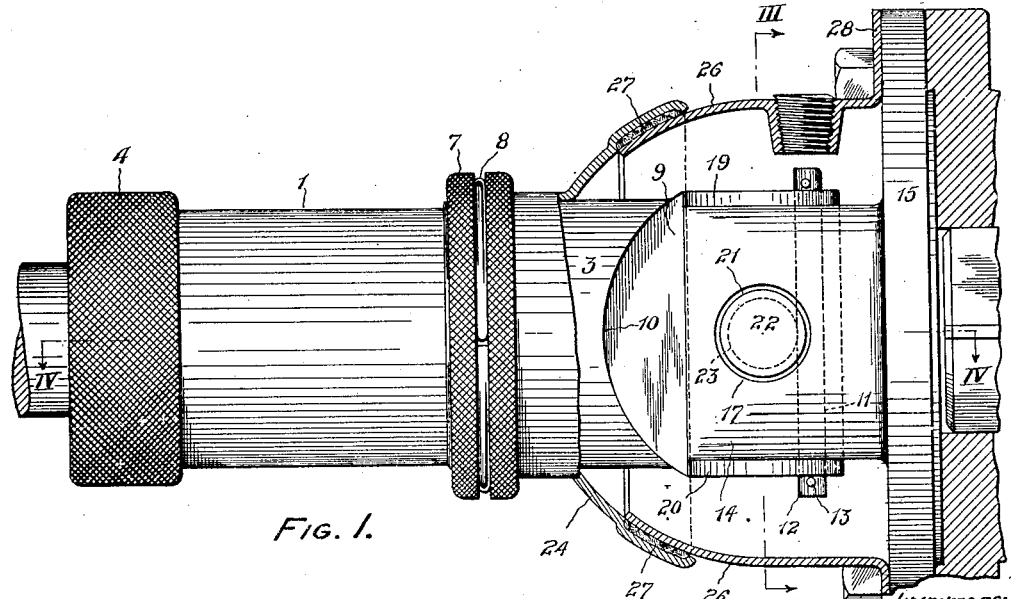

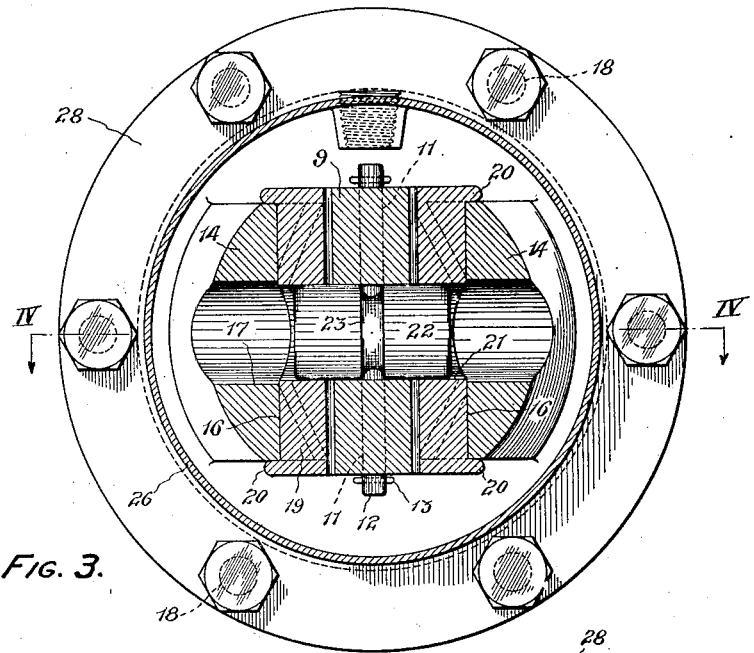
Fig. 3.
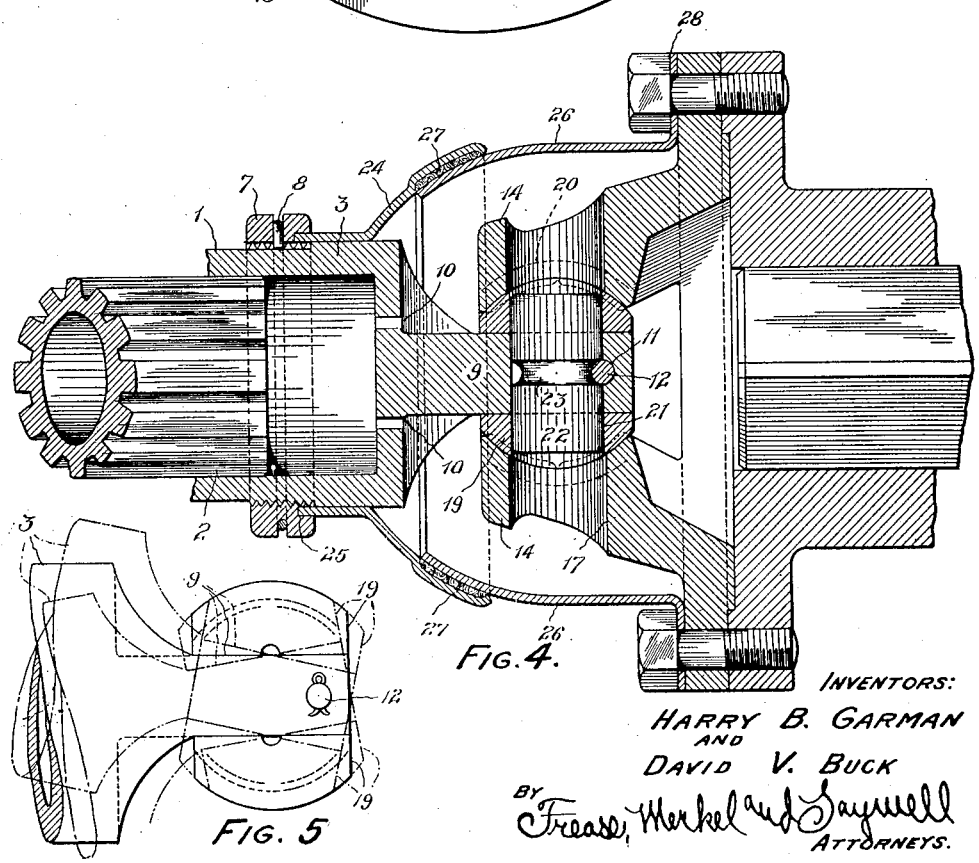
Fig. 4.
Fig. 5
INVENTORS:
HARRY B. GARMAN
AND
DAVID V. BUCK
BY Frease, Merkel and Saywell
ATTORNEYS.

HARRY B. GARMAN, OF DETROIT, MICHIGAN, AND DAVID V. BUCK, OF MILTON, PENNSYLVANIA, ASSIGNORS TO CHARLES E. THOMPSON, OF CLEVELAND, OHIO.

UNIVERSAL JOINT.

1,349,197.   Specification of Letters Patent.   Patented Aug. 10, 1920.

Application filed January 27, 1919. Serial No. 273,373.

*To all whom it may concern:*

Be it known that we, HARRY B. GARMAN, a citizen of the United States, and resident of Detroit, county of Wayne, and State of Michigan, and DAVID V. BUCK, a citizen of the United States, and resident of Milton, county of Northumberland, and State of Pennsylvania, have invented new and useful Improvements in Universal Joints, of which the following is a specification, the principle of the invention being herein explained and the best mode in which we have contemplated applying that principle, so as to distinguish it from other inventions.

Our invention relates to universal joints and particularly to devices of that character designed for use upon passenger automobiles and automobile trucks. The design is intended to provide an article of this nature which shall be both efficient and economical for the purposes designated.

The annexed drawings and the following description set forth in detail certain means embodying our invention, the disclosed means, however, constituting but one of the various mechanical forms in which the principle of the invention may be applied.

In said annexed drawings:

Figure 1 represents an elevation of our improved joint, the housing therefor being shown in broken section; Fig. 2 represents an elevation, taken at right angles to the elevation shown in Fig. 1, portions being shown in section; Fig. 3 represents a vertical section, taken in the plane indicated by the lines III—III, Fig. 1; Fig. 4 represents a horizontal longitudinal section, taken in the plane indicated by the line IV—IV, Figs. 1 and 3; and Fig. 5 represents an elevation of the intermediate and propeller shaft elements of the joint, the range of movement thereof being indicated by dotted lines.

A propeller shaft sleeve is indicated by the ordinal 1 provided with a standard S. A. E. spline 2 to take care of the center distance, said sleeve 1 being welded after the broaching operations to the element 3 of the joint. This element 3 is a drop forging which is machined, also heat treated and ground on both sides. The sleeve 1 is formed to coöperate, as noted, with the propeller shaft, a suitable stuffing box, comprising an internally threaded ferrule or nut 4, standard felt packing 5 and a ring 6 being provided, as plainly shown in Fig. 2.

At its interior end said sleeve 1 is also formed to receive an adjustable nut 7 for a housing member, hereinafter more fully described, said nut being locked in place by a lock wire 8. The inner end 9 of the drop forging 3 is of a reduced cross-section and of the shape plainly shown in Figs. 2 and 3, a clearance area indicated by the ordinal 10 being provided for a purpose hereinafter fully described. Said reduced end portion 9 is provided with a hole 11 adapted to receive a long pin 12 held by cotter pins 13 and serving a purpose hereinafter fully described.

The elements of the joint adapted to be secured to the transmission are indicated by the ordinal 14, there being a pair of said elements, oppositely disposed, of the shape plainly shown in Figs. 2 and 4, and formed with an annular flange 15. The interior oppositely disposed faces 16 of said elements 14 are bearing surfaces and are adapted to coöperate with journal members hereinafter more fully mentioned. These members 14 are drop forgings and the bearing surfaces 16 are machined at right angles to the diameter of the flange 15. The flange 15 is provided with cap screw holes 18 whereby the same may be secured to the flange of the driving hub of the transmission.

The intermediate elements of our joint comprise a pair of members 19 formed with end shoulders 20 disposed exteriorly of and abutting the end faces of the members 14, respectively. The members 19 are thus held to position by the members 14, respectively. These members 19 are machined all over, heat treated and ground. The exterior faces of the members 19 are journal surfaces coöperating with the bearing surfaces 16 of the members 14 and the interior faces of the members 19 are plane surfaces adapted freely to slide relatively to the side faces of the extended end portion 9 and to coöperate therewith. The range of movement of the extended end portion 9 relatively to the interior opposing faces of the members 19 is approximately one hundred and eighty degrees (180°), and the range of movement of the journal surfaces of the members 19 relatively to the bearing surfaces 16 of the members 14 is indicated by dotted lines in Fig. 5, a clearance for this last-mentioned range of movement being indicated by the ordinal 10, Figs. 1, 2 and 4. The members 19 and the extended end portion 9 are secured together by means of the pin 22 inserted through the holes 17 formed in the members 14 and registering with slots 21 formed in the members 19. Said pin 22 is formed with a transverse exterior groove 23 disposed in such a plane and of such a dimension as to receive the long pin 12 hereinbefore mentioned. By this means, the position of the pin 22 is fixed.

We provide a housing for our joint, the same consisting of a member 24 secured at one end in a shoulder 25 of the adjustable nut 7 and secured to and surrounding at its other end a second housing member 26, felt packing 27 being provided therebetween, as plainly shown in Figs. 1 and 2. Said housing member 26 is formed with an annular flange 28 adapted to be secured to the flange 15 of the joint elements 14 and to the transmission through the medium of suitable cap screws and the holes 18, hereinbefore mentioned. A tapped hole in the housing and a pipe plug for the insertion of lubricant is plainly indicated in Fig. 1 and suitable oil holes and grooves are suggested in the several figures.

What we claim is:

1. In a universal coupling device, the combination with driving and driven members, of a female joint element secured to one of said members and formed with a pair of spaced jaws having oppositely disposed bearing surfaces; a male joint element secured to the other of said members and extending into the space between said surfaces, said male member having lateral bearing surfaces; a pair of intermediate elements having bearing surfaces adapted to coöperate with said lateral surfaces, and journal surfaces adapted to coöperate with said oppositely disposed bearing surfaces; a pin whose ends, respectively, are extended into said pair of intermediate elements; said pin having an intermediate journal surface upon which said male element is pivotally mounted, and means for securing together against relatively longitudinal movement said spaced jaws and the adjacent intermediate elements, respectively.

2. In a universal coupling device, the combination with driving and driven members, of a female joint element secured to one of said members and formed with a pair of spaced jaws having oppositely disposed bearing surfaces; a male joint element secured to the other of said members and formed with a reduced end portion extending into the space between said surfaces, said male member having plane side faces forming lateral bearing surfaces; a pair of intermediate elements having bearing surfaces adapted to coöperate with said lateral surfaces and journal surfaces adapted to coöperate with said oppositely disposed bearing surfaces, said jaws, intermediate members, and the reduced end portion of said male member having alined holes therethrough, a pin having a journal surface intermediate its ends disposed in the hole formed in said male member and upon which the latter is pivotally mounted, the ends of said pin extending into the holes formed in said intermediate elements, said pin being formed with a circumferential groove; a second pin secured in the reduced end portion of said male element and intersecting said groove; and end shoulders formed upon said intermediate elements exteriorly of said spaced jaws for preventing the longitudinal movement of said intermediate elements.

3. In a universal joint, the combination of a male member and a female member, the latter having a heavy base portion and a bifurcated head mounted thereon, and forming a balanced member, said members being, respectively, secured to the ends of shafts designed to be coupled together, said male member having a reduced end portion extending between the jaws of said bifurcated head and forming the unbalanced adjusting element of the joint; cylinder segments disposed intermediately said reduced portion of the male member and the inner faces, respectively, of said jaws in the female member, the male member having lateral bearings coöperating with said segments, respectively, and the latter and the inner faces of said jaws having relative sliding surfaces; means securing together in one plane said cylinder segments and said male member, the latter being pivotally mounted upon said means in a transverse plane; and means preventing the longitudinal movement of said cylinder segments.

Signed by us, this 7th day of Jany., 1919.

H. B. GARMAN.
D. V. BUCK.